United States Patent
Yee et al.

(10) Patent No.: US 7,929,673 B2
(45) Date of Patent: Apr. 19, 2011

(54) SINGLE BUTTON OPERATIONS FOR A DEVICE

(75) Inventors: Dawson Yee, Bellevue, WA (US); Andrew P. Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 11/447,461

(22) Filed: Jun. 6, 2006

(65) Prior Publication Data
US 2007/0280459 A1    Dec. 6, 2007

(51) Int. Cl.
*H04M 11/00*    (2006.01)
(52) U.S. Cl. ............... 379/93.21; 455/416; 379/202.01
(58) Field of Classification Search ............... 379/93.21, 379/202.01, 206.01; 455/416
See application file for complete search history.

(56) References Cited

U.S. PATENT DOCUMENTS

| | | | |
|---|---|---|---|
| 6,898,569 B1 * | 5/2005 | Bansal et al. | 705/9 |
| 2003/0217073 A1 * | 11/2003 | Walther et al. | 707/104.1 |
| 2005/0018827 A1 * | 1/2005 | Himmel et al. | 379/202.01 |
| 2005/0227680 A1 * | 10/2005 | Snowden | 455/416 |
| 2006/0083358 A1 * | 4/2006 | Fong et al. | 379/88.13 |
| 2007/0008239 A1 * | 1/2007 | Stroupe et al. | 345/1.1 |
| 2007/0021107 A1 * | 1/2007 | Veige | 455/414.1 |
| 2007/0112929 A1 * | 5/2007 | Etelapera | 709/207 |

* cited by examiner

*Primary Examiner* — Stella L Woo (57) ABSTRACT

Techniques are provided for configuring a device. One or more operations are determined in accordance with a scheduled meeting. One or more configurable buttons on the device are provided. Each of the one or more configurable buttons corresponds to one of the operations. Selecting a first of the one or more configurable buttons causes processing to be performed for a first of the operations associated with the first configurable button. The first operation uses information associated with said scheduled meeting.

20 Claims, 8 Drawing Sheets

| Date 202 | Time 204 | Attendees 206 | Conference Call In Information 208 | . . . . |
|---|---|---|---|---|
| | | | | |

SINGLE BUTTON OPERATIONS FOR A DEVICE

BACKGROUND

In connection with participating in a conference call, such as telephone conference call, a user may perform multiple steps. The user obtains the phone number and possibly a conference line access code. This information may be included in an electronic appointment entry or email meeting notification which the user must first locate. The user then manually dials the phone number and enters the access code. The foregoing processing steps are performed manually and may be tedious or cumbersome to complete. This may be especially true for users participating from a mobile device and when such users may also be trying to participate while walking around, driving, and the like.

There are notification operations a user may perform with respect to participants of a scheduled conference call. With an existing technique, the user may contact or notify all participants by manually starting an email application, locating the email meeting notification or other correspondence having the list of all participants, and then sending a reply email to all participants. A drawback is that the foregoing processing can also be tedious to complete and present additional difficulties to users on a mobile device as described above. Additionally, the user may have deleted the email having the list of all participants and may have to reconstruct the email address list of all meeting participants.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for configuring a device. One or more operations are determined in accordance with a scheduled meeting. One or more configurable buttons on the device are provided. Each of the one or more configurable buttons corresponds to one of the operations. Selecting a first of the one or more configurable buttons causes processing to be performed for a first of the operations associated with the first configurable button. The first operation uses information associated with said scheduled meeting.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
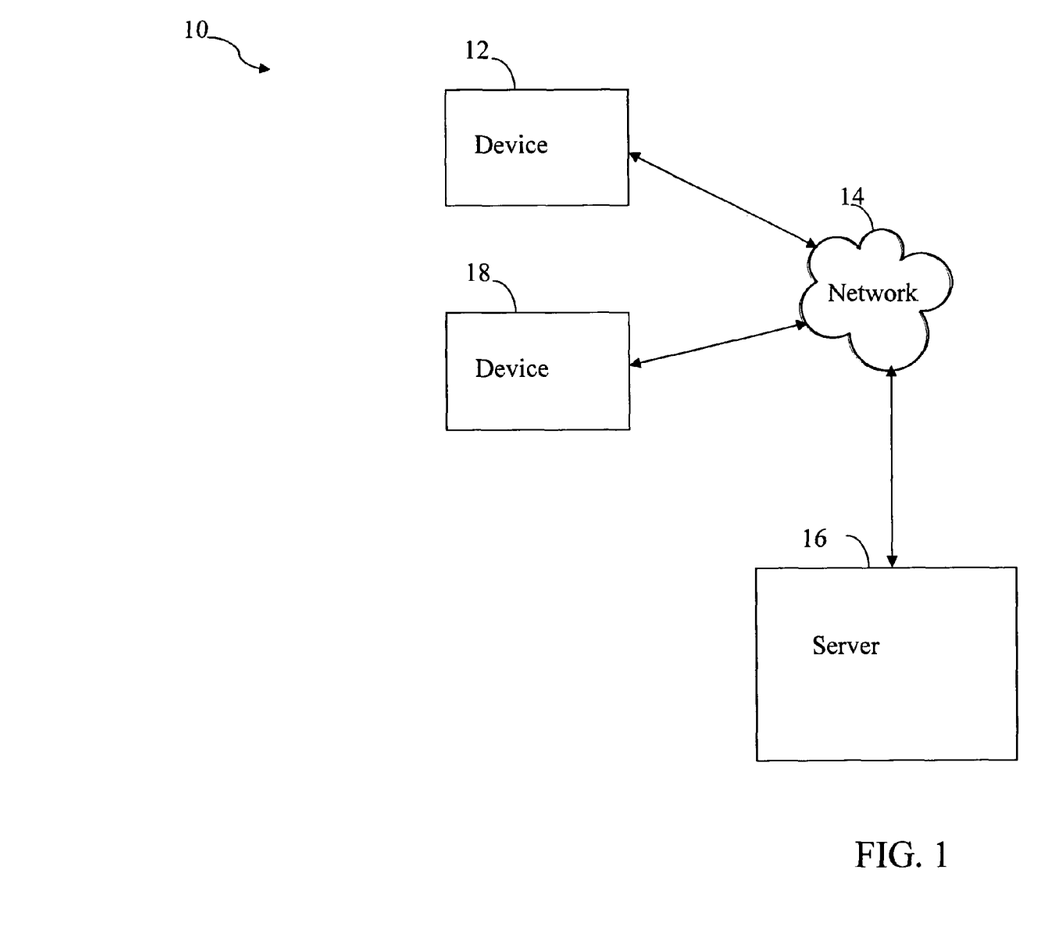
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with configurable buttons or keys. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are devices 12 and 18, a network 14, and a server 16. The devices 12 and 18 may communicate with the server 16 over the network 14.

The device 12 may be, for example, an office phone, a mobile communications device, an office computer or other device capable of performing conferencing functions. Such functions may include sending and receiving voice transmissions for a voice or audio conference. The device may also include audio/video conferencing components for video conferencing. The device may be a wireless or non-wireless device. The particular arrangements and devices used in examples herein are for purposes of illustrating the techniques described herein in connection with configurable or programmable keys, buttons, and the like, on a device. Any device that has connectivity to the server 18 and having the functionality described herein may be included in an embodiment. Additionally, although two devices are illustrated in FIG. 1, an embodiment may include a different number of devices. The devices 12 and 18 may include a processor used to execute code included in one or more program modules. Described in more detail elsewhere herein are program modules that may be executed by the devices in connection with the techniques described herein. The devices 12 and 18 may operate in a networked environment and communicate with the server 18 and other components not shown in FIG. 1. The server 18 may operate in a networked environment and communicate with other components also not shown in FIG. 1.

As will be described in following paragraphs in connection with one embodiment, a user may schedule a conference or meeting with one or more participants using a calendar and scheduling program. A participant may want to perform a variety of different operations with respect to the electronically scheduled meeting. The operations may include multiple steps which may otherwise be performed manually using existing techniques. As described herein in more detail, such operations may include, for example, dialing in to participate in a scheduled conference, notification by a first participant to others that the first participant is running late for a meeting, and contacting all participants to arrange a meeting at a current or future time. It may be cumbersome and time consuming to perform the steps manually for such operations.

Described herein are techniques that facilitate performing the foregoing or other operations in an automated fashion by associating each operation with a button or key on a user's device. In one embodiment, the buttons or keys may be characterized as configurable, programmable "soft" keys having values and functions. The particular operations for which the buttons or keys are programmed may change in accordance with a received message notification for a meeting, or an appointment calendar entry for a meeting, currently viewed in a display area of the device. In one embodiment, the operations may be performed with respect to the meeting associated with the foregoing notification or calendar entry.

It will be appreciated by those skilled in the art that although the components of FIG. 1 are shown in the example as communicating in a networked environment, the components may communicate with other components utilizing different communication mediums. For example, the server 16 may communicate with one or more components utilizing a network connection, and/or other type of link known in the art including, but not limited to, the Internet, an intranet, or other wireless and/or hardwired connection(s).

Figure 2:
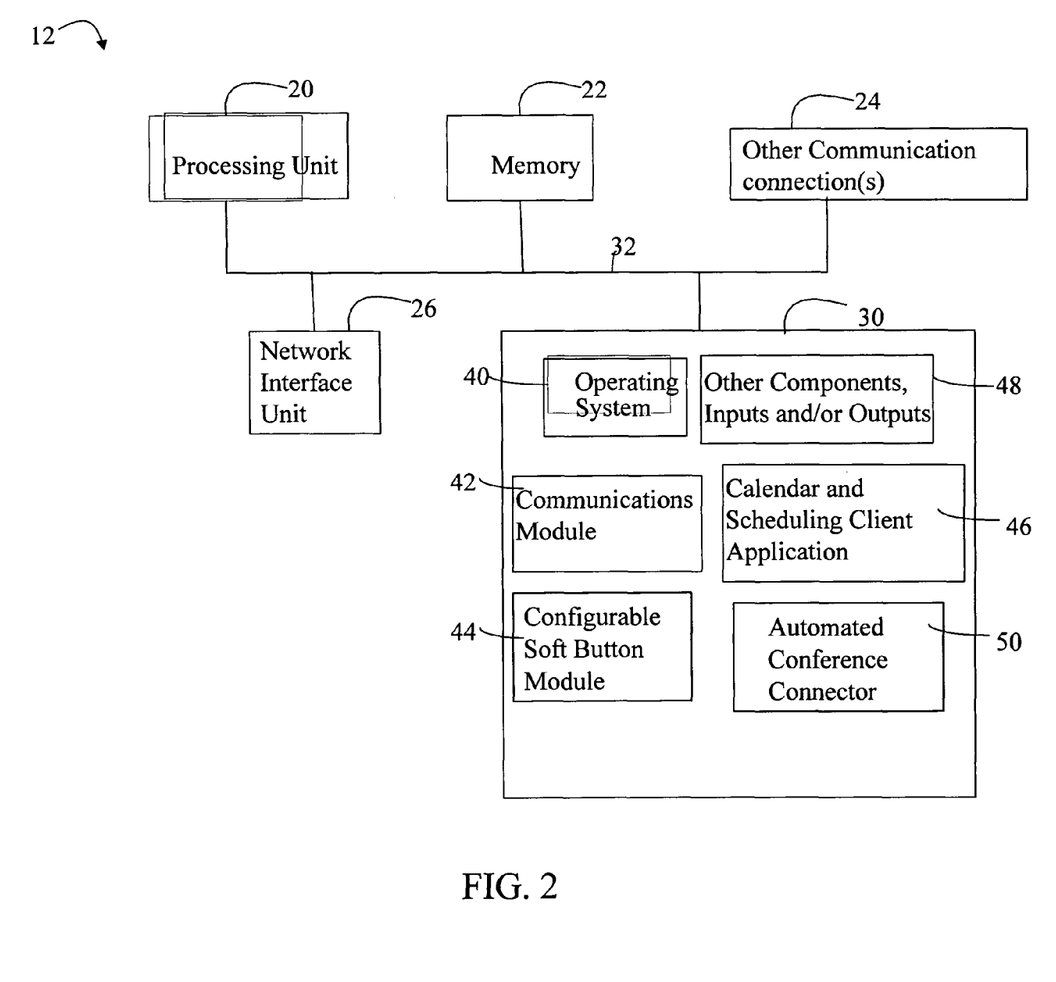
FIG. 2 is an example of components that may be included in an embodiment of a device for use in connection with performing the techniques described herein.

Referring now to FIG. 2, shown is an example of components that may be included in the device 12, as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the device 12 may operate in a networked environment as illustrated in FIG. 1 using logical connections to remote computers and other components through a network. The device 12 may connect to a network including the device 12 and the server 18 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, a communications module 42, a configurable soft button module 44, a calendar and scheduling client application 46, an automated conference connector 50, and other components, inputs, and/or outputs 48.

The operating system 40 may be any one of a variety of commercially available or proprietary operating systems. The operating system 40, for example, may be loaded into memory in connection with controlling operation of the user computer. One or more application programs 46 may execute in the user computer 12 in connection with performing user tasks and operations. The particular application programs, if any, may vary with device.

The communications module 42 may be used by the device in facilitating communications between the device and other external components, such as the server 18 and in connection with processing any incoming/outgoing transmissions that may vary with the particular device. For example, the device may be used for telephone voice transmissions and the communications module 42 facilitates such incoming and outgoing transmissions.

The configurable soft button module 44 may be used in connection with programming or configuring the soft buttons in response to varying criteria. For example, as will be described herein in more detail, the module 44 may configure one or more buttons to a first setting in response to receiving a meeting notification in a display area. The module 44 may also facilitate processing associated with a selection of one of the buttons, and may communicate information regarding the selection to one or more other components. For example, in response to selecting a first soft button or key having an associated operation, the module 44 may communicate with the calendar and scheduling client application 46 to perform one or more processing steps to complete the associate operation.

The calendar and scheduling client application 46 may be characterized as a client-side portion of an application utilized to schedule meetings, keep a calendar of activities, appointments, and the like. The client application 46 may communicate with a corresponding server-side portion at a central location, the server 16. In one embodiment, the client application 46 may collect data regarding a newly scheduled meeting, for example, which is then transmitted and stored at the server 16.

With reference to FIG. 1 as one exemplary embodiment, a first user may schedule a meeting using the calendar and scheduling client application 46 residing on the first user's device. The first user may enter the meeting information on her device. The calendar and scheduling client application may communicate the meeting information and other data for the first user to a central location such as to the server 16. At the server 16, a calendar and scheduling server application receives and processes any data received from the calendar and scheduling client application. Others who utilize the services and functionality of the calendar and scheduling application may do so in a manner similar to the first user with a calendar and scheduling client application on their respective devices.

As a result of scheduling the meeting, a meeting invitation may be sent to all requested attendees also having an instance of the client application 46 on their devices. The calendar and scheduling server application on the server 16 sends out the invitation to all attendees. In response to an attendee accepting the invitation, the calendar of the accepting attendee as stored on the server 16 may be updated to reflect the meeting. As the time for the meeting draws closer, the calendar and scheduling server application may send the client application 46 one or more meeting reminder notifications at various times. A final notification may be sent when the current time reaches the scheduled meeting time. Such notifications may be displayed on the device executing the client application 46.

In response to such notifications, the device 12 may have one or more soft buttons configured as active by module 44. Each soft button may correspond to a different operation which may be taken by a user in response to the notification. Selection of a soft button may result in execution of processing steps to perform the corresponding operation. The particular configuration of one or more of the soft buttons may change with time as well as when information other than a notification is displayed on the device. The soft buttons may also be programmed to a different configuration, for example, when an appointment entry from the client application 46 is displayed on the device. Examples of such operations and processing performed are described elsewhere herein. The operations associated with the soft buttons may be performed with respect to a current meeting context. The meeting context may be the meeting for which a notification or corresponding appoint entry is currently displayed on the device.

The automated conference connector 50 may be used in connection with performing processing to facilitate connecting the device for a scheduled meeting. The automated conference connector 50 performs processing for one operation associated with a soft button that may be selected by the user in response to receiving a notification that it is time for the scheduled meeting. The connector 50 may obtain conference call in information including the telephone number for the conference call and any other access or pass code information. The connector 50 may obtain the foregoing conference call in information from calendar and scheduling data associated with the scheduled meeting. The connector 50 may obtain this information from the client application 46, for example, if such information is included in the meeting reminder or notification. Alternatively, the connector 50 may obtain this information from the server 16 by communicating, directly or indirectly, with the calendar and scheduling server application of the server 16. The connector 50 may then perform processing to connect for a scheduled meeting which, in this example, may be a telephone conference call. The device 12 may be a telephone or other communications device, such as a PDA, capable of telephone communications in combination with possibly other communications.

Although only details of device 12 have been described, other devices such as 18, may include components similar to those as described in FIG. 2.

Figure 3:
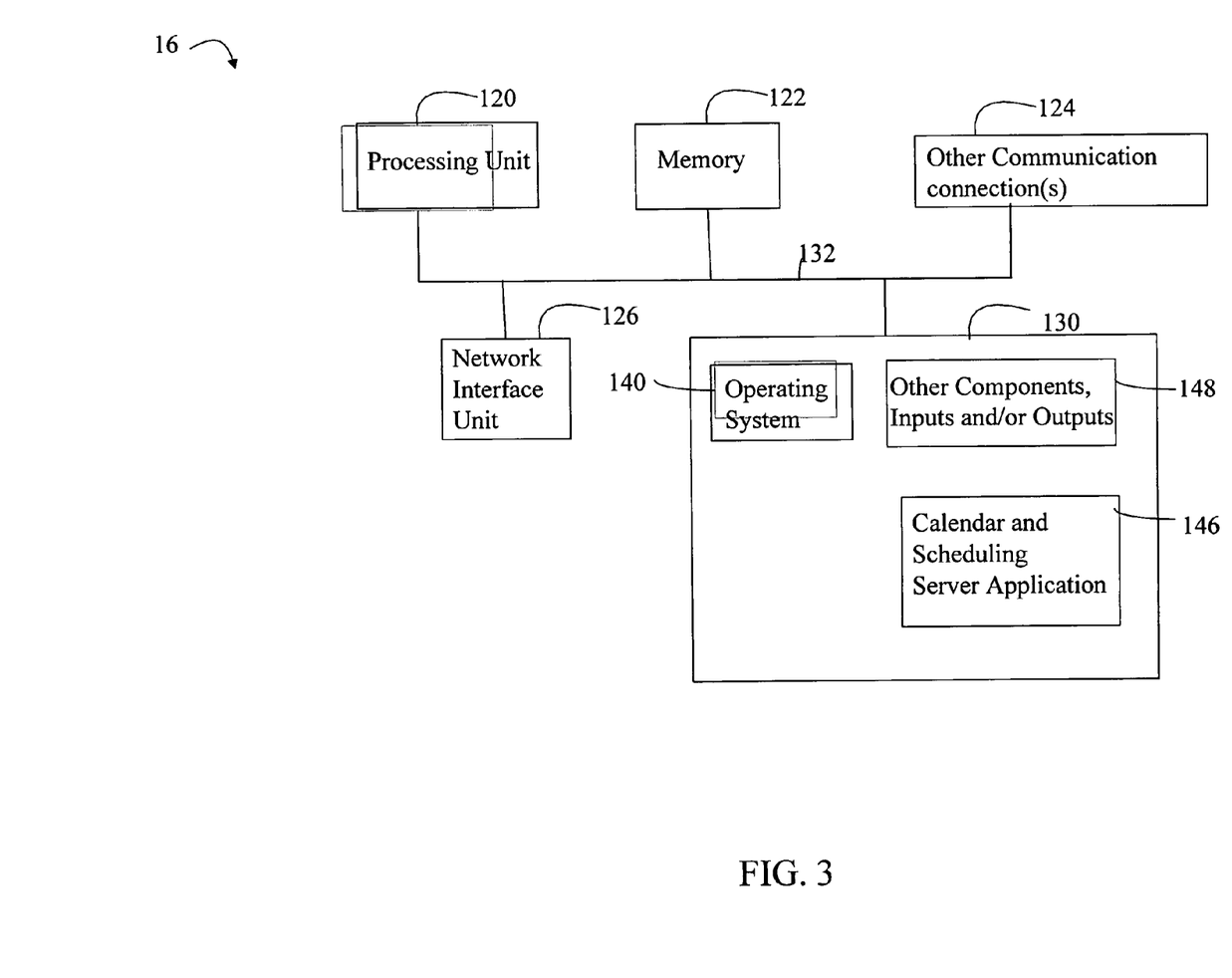
FIG. 3 is an example of components that may be included in an embodiment of a server for use in connection with performing the techniques described herein.

Referring now to FIG. 3, shown is an example of components that may be included in the server 16 and used in connection with performing the various embodiments of the techniques described herein. As illustrated in FIG. 3, an embodiment of the server 16 may include components similar to those described in connection with FIG. 2. Additionally, the server 16 may include a calendar and scheduling server application 146.

The calendar and scheduling server application 146 is described above as the server-side portion of the calendar and scheduling application. The server application 146 collects and maintains the calendar and appointment information for one or more users as communicated through one or more instances of the client application 46 on various devices. The server application 146 may send out notifications to one or more client applications 46 in connection with scheduled meetings. Such notifications may include meeting reminders as a scheduled meeting time draws near, a final meeting notification when the meeting time arrives, and other notifications in connection with a scheduled meeting. As will be described herein, such notifications may be sent in response to a user selecting one of the soft buttons or keys. For example, in response to receiving a meeting reminder, a user may select a soft button which results in a notification being sent to all other attendees scheduled for the meeting. As described in following paragraphs, the server application 146 may send out such notifications to all attendees, or a selected portion thereof, using meeting information as maintained by the application 146.

Figure 4:
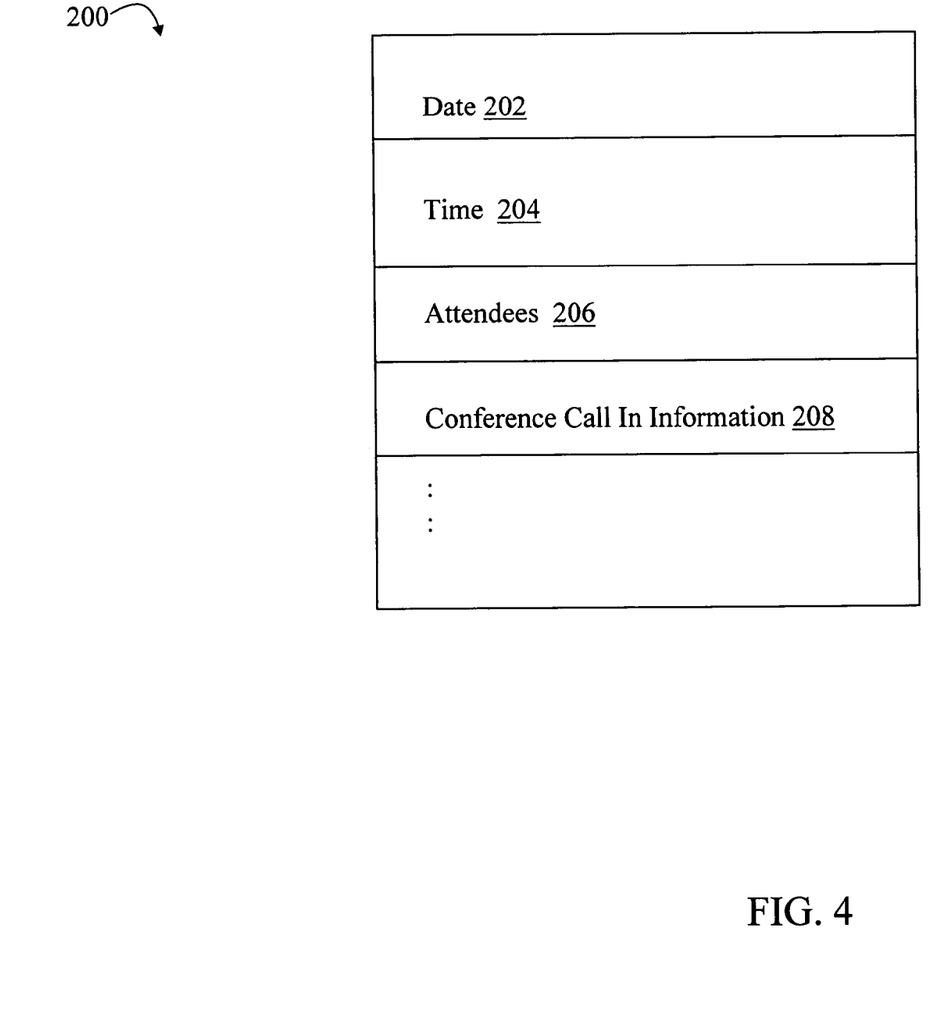
FIG. 4 is an example of information that may be obtained in connection with scheduling a meeting.

Referring now to FIG. 4, shown is an example 200 of information that may be entered in connection with scheduling a meeting. As described above, a user may enter such information using an instance of the client application 46 on the user's device. The information of 200 may entered, for example, using a form with multiple fields. Once entered, the information may be communicated to the server application 146. In the example 200, the meeting information may include a meeting date 202, time 204, a list of attendees 206, and conference call in information 208. The time 204 may specify a start and end time. The attendees 206 may be a list of one or more other users having an instance of the client application 46. In this example, the client application 46 and the server application 146 may utilize email for communications such as notices, meeting reminders, and the like. As such, the list of attendees may be specified via a user identifier associated with an email address for the user. A communication sent to the email address for the user results in the communication being sent to the user's device including the client application 46.

The conference call in information 208 may include a telephone number for a scheduled conference call, and any pass code or other access information needed to participate in the in the call. It should be noted that the conference call in information 208 may be applicable when the scheduled meeting, for example, is a telephone conference. Such information in 208 may not be applicable for use with in-person meetings scheduled using the calendar and scheduling application.

An embodiment may also utilize other information than as illustrated in FIG. 4 in connection with a scheduled meeting. The information included in 200 may be stored and maintained on the server 16 by the server application 146.

Users may customize the calendar and scheduling functionality. For example, a user may select options to receive meeting reminder notifications at various time intervals prior to a scheduled meeting. The user may also receive a final notification when the meeting time arrives. Such notifications are generated and transmitted by the server application 146 to the client application 46 of the user. The notifications may be composed by the server application 146 using the information as illustrated in the example 400. In one embodiment, the notification messages sent to the client application 46 may include the conference call in information 208. In such an embodiment, the information 208 may be used by the automated conference connector 50 to automatically connect to a scheduled telephone conference.

Figure 5:
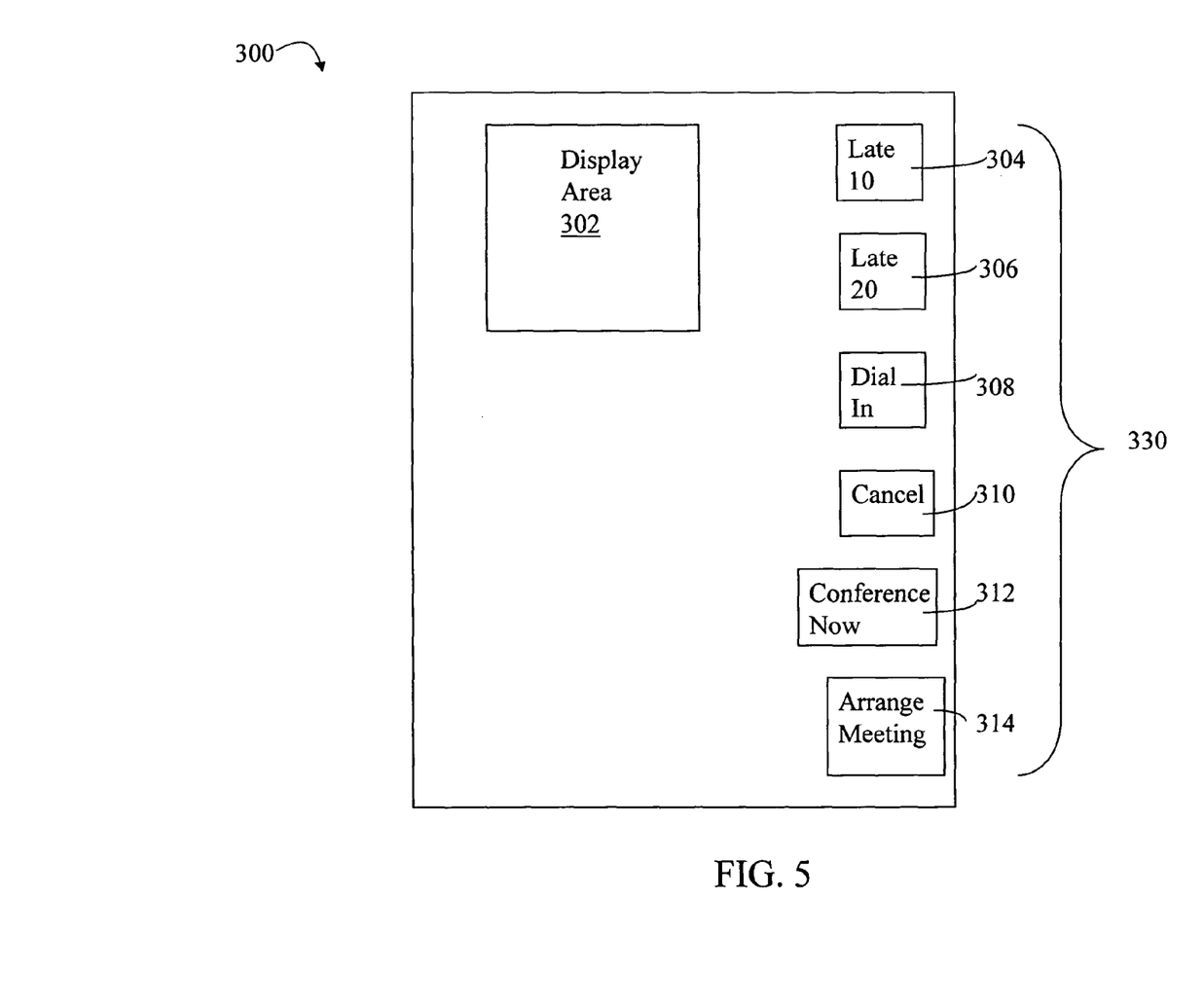
FIG. 5 is an example of soft buttons and a display area as may be included in a device.

Referring now to FIG. 5, shown is an example of soft buttons and a display area as may be included in a device, such as devices 12 and 18, and used in connection with the techniques described herein. The example 300 includes a display area 302, and a plurality of soft buttons or keys 330. It should be noted that an embodiment may include a portion of the buttons or keys of 330 rather than all. The display area 302 may vary with the particular device. For example, the device may be a mobile communications device having a single display. As such, the display area 302 may be the single display area of the device. The device may also include more than one display area. For example, the device may be a telephone that includes a primary display area and an auxiliary display area. The auxiliary display area may be used to display any notifications as generated in connection with the techniques described herein.

One or more of the soft buttons 330 may be configured as active at a point in time in accordance with criteria associated with the device. The criteria may reflect the state of the device at a point in time. The criteria may include the current time, the notification displayed in the display area 302, and/or the selected appointment information displayed in the display area 302.

In response to selecting one of the actively displayed soft buttons in 330, processing steps associated with an operation represented by the selected soft button are performed. What will now be described are the different operations which may correspond to the various soft buttons included in 330 in one embodiment.

Soft buttons 304 and 306 may correspond to notification operations which inform meeting participants that another participant making the soft button selection is going to be late for a scheduled meeting. The operations of buttons 304, 306 and others may be applied in the context of a meeting associated with a current notification, appointment entry, and the like as may be displayed in display area 302. In this example, selection of button 304 results in a notification message that the user making the selection is running 10 minutes late. Selection of button 306 results in a notification message that the user making the selection is running 20 minutes late. An embodiment may configure soft buttons to other amounts of time than as described herein. An embodiment may also include a button which may be characterized as a generic late soft button not having a predetermined amount of time associated therewith. Such a soft button may be displayed as "Late". Buttons 304 and 306 may be displayed or otherwise configured as active, for example, when a device receives a meeting reminder or final notification which is displayed in area 302. In response to selecting 304 or 306, the module 44 communicates with the client application 46 regarding the selection and the amount of time the user making the selection is running late. The client application 46 communicates with the server application 146. The server application 146 uses the attendee list included in the scheduled meeting information to dispatch a notification to all other attendees that the user making the selection is running late. The notification may be received and displayed on devices of the other attendees. An embodiment may also update the calendars of each attendee to reflect the new meeting time as a result of the amount of time the user initiating the notification is running late.

Soft button 310 corresponds to a notification operation which informs meeting participants that another participant making the soft button selection is canceling the meeting and will not be participating. In one embodiment, the cancel operation may result in a notification message sent to all attendees in a manner as described in connection with buttons 304 and 306. The notification may indicate that the user selecting button 310 is unable to participate and other attendees may elect to continue with the meeting. An embodiment may update the calendar of the user selecting button 310 to remove the scheduled meeting. In another embodiment, selection of button 310 may result in the meeting being cancelled for all attendees. In such an embodiment, the server application 146 may update the calendars of all attendees to reflect the cancellation. Soft button 310 may be operable and performed with respect to a current notification or appointment entry displayed in area 302.

Soft button 308 corresponds to the operation of connecting to a scheduled conference, such as a scheduled phone conference. Selection of button 308 results in processing steps performed by the automated conference connector 50 to connect to the scheduled conference. Soft button 308 processing may be performed with respect to the current notification as displayed in area 302. In response to selecting 308, the module 44 of a device communicates the selection to the connector 50. The connector 50 obtains the conference call in information. As described elsewhere herein, the conference call in information may be obtained from the meeting notification if so included in the notification. The connector 50 may also obtain the call in information from the server application 146. The connector 50 may then communicate with the communications module 42 to dial into the scheduled conference. In one embodiment, the device upon which the soft buttons are displayed may be a communications device capable of sending and receiving telephone calls. The communications module 42 may communicate with other components in the device to proceed with calling into the conference. In another embodiment, the device may not be able to send/receive telephone calls and may communicate with a telephone or other device having the appropriate capabilities to call into the conference. For example, the device may communicate with a second device, such as a telephone, located in close physical proximity to the device. The devices may communicate in accordance with the Bluetooth short range wireless connectivity standard.

Soft button 312 corresponds to the operation of setting up a meeting or conference at the time the button 312 is currently selected. The meeting participants may be those attendees associated with a current meeting notification or appointment entry as may be displayed in area 302, or any predefined group. Selection of button 312 results in processing steps performed to set up an ad-hoc meeting at the current time with all available attendees. Such an ad-hoc meeting may be desired, for example, if a user is running late for an in-person meeting. The user may receive a notification on a device in area 302. The user may realize that she will be late for the scheduled meeting and may elect to have a phone conference with all attendees now. In one embodiment, the device including soft button 312 may be capable of sending and receiving telephone communications. In response to selecting soft button 312 on a device, the module 44 may communicate with the client application 46. The client application 46 may communicate with the server application 146 to obtain the necessary telephone contact information for each meeting attendee. The client application 46 may then communicate with the communications module 42 of the device to connect and link in all available attendees. It should be noted that the server 16 may alternatively perform the processing to contact and link in each available attendee.

Soft button 314 corresponds to the operation of setting up a meeting or conference by sending out an electronic meeting invitation. The meeting participants may be those attendees associated with a current meeting notification or appointment entry as may be displayed in area 302. Selection of button 314 results in processing steps performed to set up a follow-up meeting with all attendees included in the meeting related to the current notification or appointment entry in area 302. In response to selecting soft button 314 on a device, the module 44 may communicate a request to set up the meeting to the client application 46. The client application 46 may prompt the user for date/time information for the ad-hoc meeting and then communicates the request to the server application 146. The server application 146 may send out meeting invitations to all attendees using information stored on the server 16.

It should be noted that rather than prompt the user for date/time meeting information, a set of default date/time information may be used in an embodiment. For example, a default date/time may be the current day and the meeting is to begin on the next hour or within a specified amount of time.

In one embodiment, buttons 304, 306, 310, and 312 may not be configured as active if the meeting notification in area 302 has already occurred (e.g., is a past event). If an appointment or calendar entry is displayed in 302, soft buttons 310, 312, and 314 may be actively configured. Soft button 310 may not be configured as active if the displayed appointment refers to a past event.

It should be noted that buttons 304, 306, 310, and 314 may apply to in-person meetings as well as conferences scheduled using the devices, such as telephone conferences.

Figure 6:
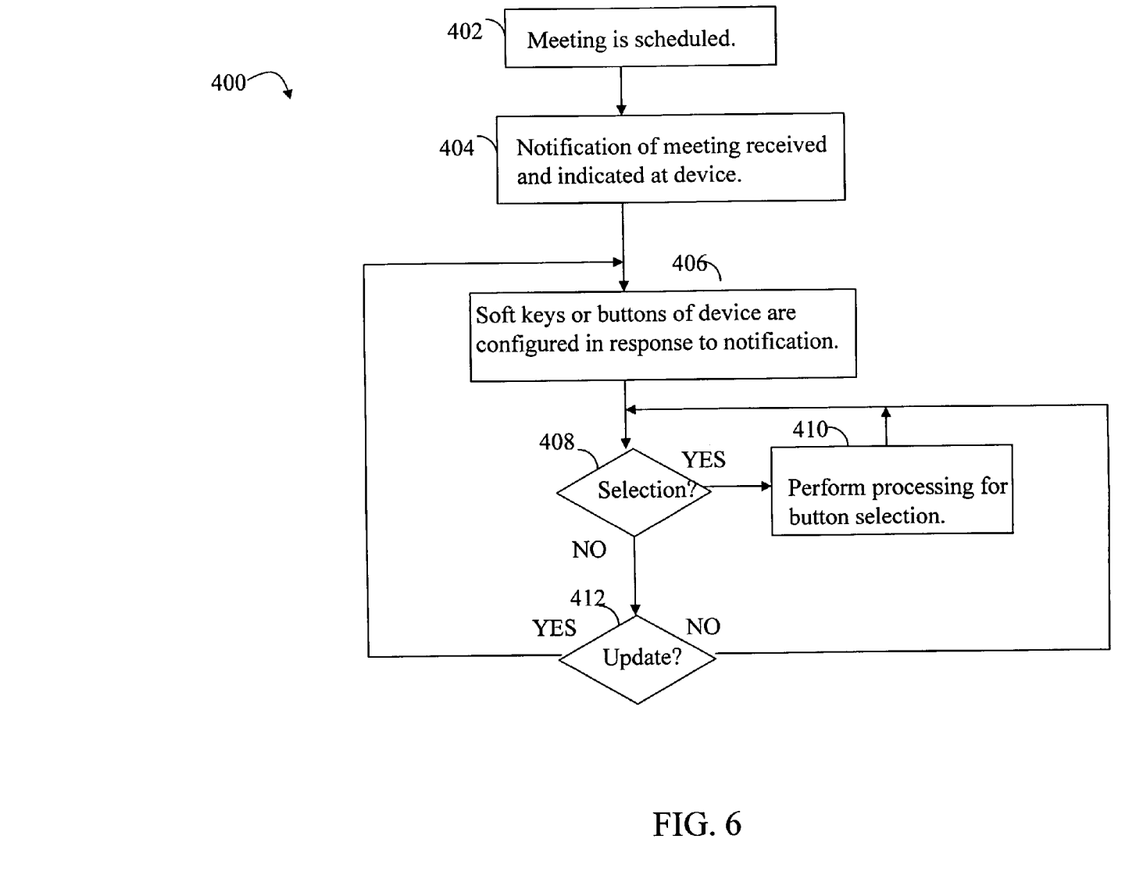
FIGS. 6, 7, and 8 are flowcharts of processing steps that may be performed in an embodiment in connection with the techniques described herein.

Referring now to FIG. 6, shown is a flowchart of processing steps that may be performed in an embodiment in connection with a the techniques described herein. In the example 400, soft keys or buttons may be configured in response to receiving a meeting notification, such as a meeting reminder, which is displayed in area 302. Flowchart 400 summarizes processing steps described above. At step 402, a meeting is scheduled. At step 404, a meeting notification, such as a meeting reminder, may be received and indicated at a user's device. At step 406, one or more soft buttons or keys may be configured as active in response to the received and displayed notification. At step 408, a determination is made as to whether a selection of a soft button or key has been made. If so, control proceeds to step 410 to perform processing for the button selection. From step 410, control proceeds to step 408 to wait for the next soft button selection. Otherwise, if step 408 evaluates to no, control proceeds to step 412 where a determination is made as to whether the soft keys or buttons need to be updated. As described herein, a configuration of soft keys or buttons may be updated due to changes in time causing a current meeting to become a past event. Whether a meeting is a past event may affect the currently active set of soft keys or buttons. If step 412 evaluates to no, control proceeds to step 408. If step 412 evaluates to yes, control proceeds to step 406. Steps 406, 408, and 412 may be performed by the module 44. Step 410 may be initiated by the module 44, for example, by communicating with one or more other modules as described herein.

Figure 7:
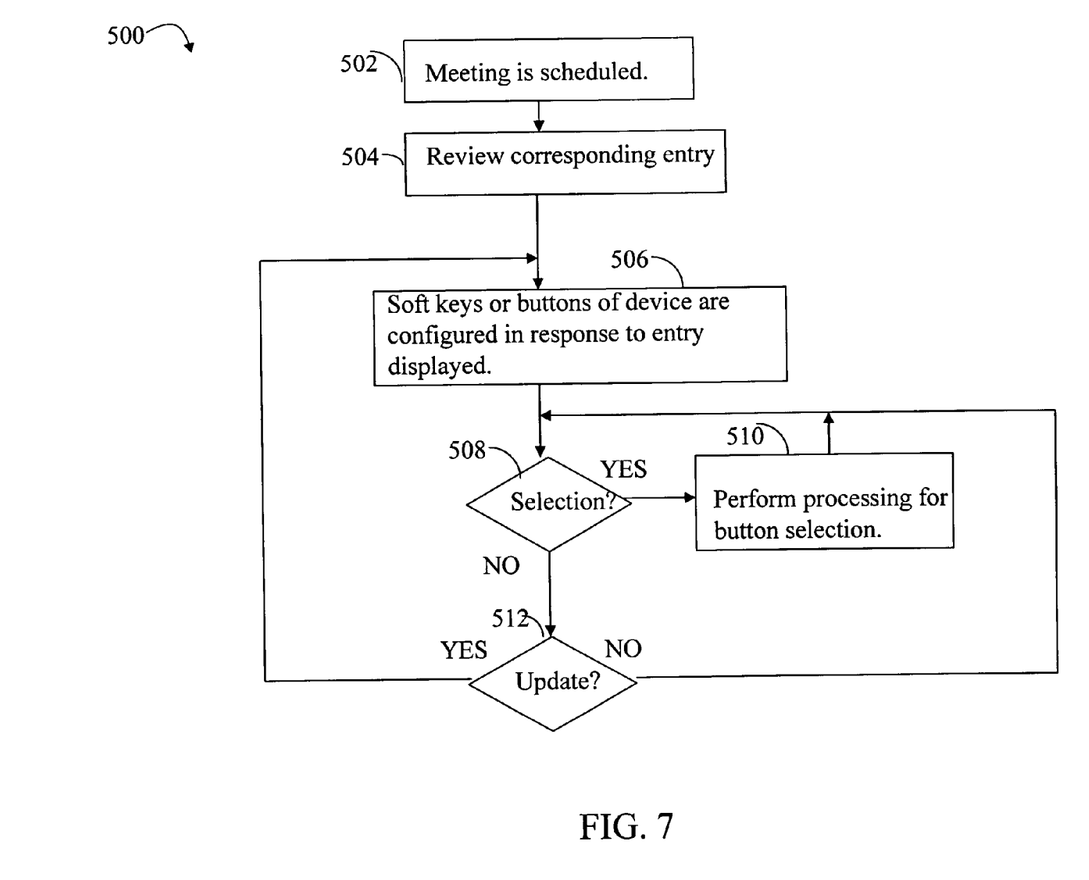

Referring now to FIG. 7, shown is a flowchart of processing steps that may be performed in an embodiment in connection with currently selected appointment or calendar entry for a meeting such as may be displayed in area 302. Steps 502, 504, 506, 508, 510, and 512 are respectively similar to steps 402, 404, 406, 408, 410, and 412 of FIG. 6 with a difference at step 504. In step 504, the display area 302 may include the entry being reviewed rather than a notification as in step 404.

Figure 8:
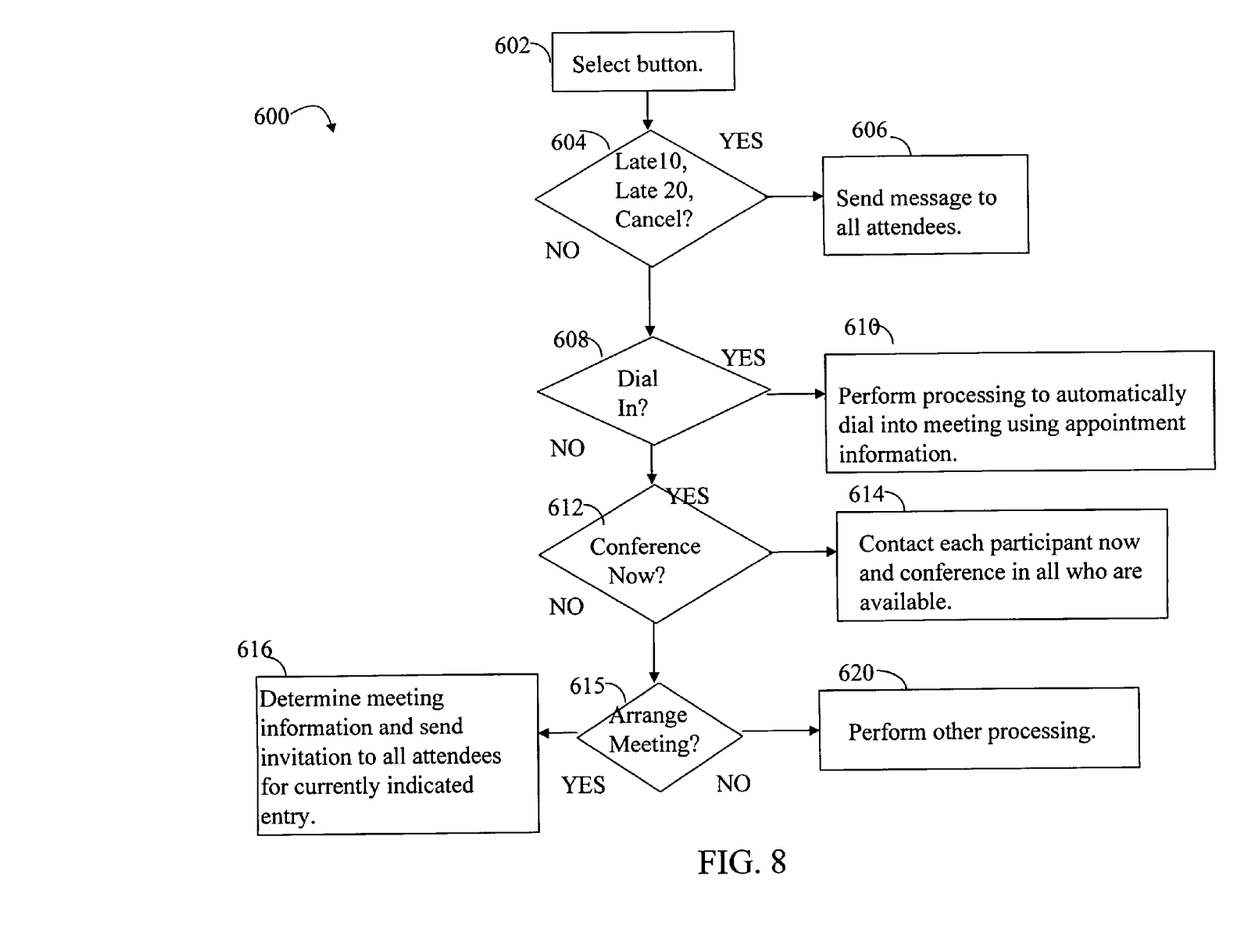

Referring now to FIG. 8, shown is a flowchart of processing steps that may be performed in an embodiment in connection with processing a soft button selection. At step 602, a soft button selection is made. At step 604, a determination is made as to whether the button selected in step 602 is the Late10, Late20, or cancel button. If so, control proceeds to step 606 to perform processing to notify all attendees. It should be noted that additional processing may be performed in connection with the cancel operation in accordance with the particular processing steps performed in an embodiment for the cancel operation. If step 604 evaluates to no, control proceeds to step 608 where a determination is made as to whether the selected soft button is the Dial In button. If so, control proceeds to step 610 to perform processing as described herein to dial into the scheduled meeting. If step 608 evaluates to no, control proceeds to step 612 where a determination is made as to whether the soft button selected is the Conference Now button. If so, control proceeds to step 614 to contact each participant or meeting attendee and conference in all who are available. If step 612 evaluates to no, control proceeds to step 615 where a determination is made as to whether the selected soft button is the Arrange Meeting button. If step 615 evaluates to yes, control proceeds to step 616 to perform processing for the Arrange Meeting button where the meeting information is obtained for the meeting to be scheduled. As described herein, one embodiment may prompt the user for date/time information. An embodiment may also use default meeting information rather than prompt the user for input. A meeting invitation may be sent to all attendees for the currently displayed entry. If step 615 evaluates to no, control proceeds to step 620 to perform other processing in accordance with the selected soft button.

It should be noted that although a client-server model has been described herein in connection with the calendar and scheduling application, an embodiment may also use applications with different models, such as a peer-to-peer application.

The soft buttons or keys which are programmable may vary with an embodiment. In one embodiment, a current operation or function for a programmable button may be included in a display area in close proximity to a corresponding physical button. As the soft key is programmed, the displayed operation in the display are may be modified. Selection of the soft key may be made by selecting the corresponding physical button. In another embodiment, the soft key may be included on a touch screen display having a text description which changes in accordance with the currently programmed operation of the soft key. Selection of the soft key may be made by depressing the portion of the display area where the soft key is displayed. Other embodiments may use other techniques to implement the soft buttons or keys described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of configuring a device comprising:
   determining one or more operations in accordance with a scheduled meeting; and
   providing one or more configurable buttons on the device, each of said one or more configurable buttons corresponding to one of said operations, wherein selecting a first of said one or more configurable buttons causes processing to be performed for a first of said operations associated with said first configurable button, said first operation initiating a communication using information associated with said scheduled meeting, and wherein said one or more configurable buttons is configured in response to a received notification.

2. The method of claim 1, wherein said one or more configurable buttons which are active at a point in time change in response to a received notification.

3. The method of claim 2, wherein selection of said first configurable button causes processing to be performed to connect the device to the scheduled meeting.

4. The method of claim 1, wherein said one or more configurable buttons which are active at a point in time change in response to a selected appointment entry.

5. The method of claim 1, wherein selecting said first configurable button causes conference call in information to be obtained.

6. The method of claim 5, wherein selecting said first configurable button causes an audio conference phone number to be automatically dialed.

7. The method of claim 5, wherein said conference call in information includes an audio conference number and an access code.

8. The method of claim 1, wherein said device is a phone.

9. The method of claim 1, wherein said device is a computer.

10. The method of claim 1, wherein said device is a mobile communications device.

11. The method of claim 5, wherein said conference call in information is obtained from a calendar and scheduling server application and wherein said device includes a calendar and scheduling client application used to schedule the scheduled meeting.

12. A method of configuring a device comprising:
   determining one or more operations in accordance with a scheduled meeting; and
   providing one or more configurable buttons on the device, each of said one or more configurable buttons corresponding to one of said operations, wherein selecting a first of said one or more configurable buttons causes processing to be performed to send a notification to attendees of the scheduled meeting that an attendee associated with said device is late for said scheduled meeting.

13. The method of claim 12, wherein said device communicates with a calendar and scheduling server application to send said notification.

14. The method of claim 12, further comprising:
   updating a calendar of scheduled appointments for each of said attendees in accordance with said notification.

15. The method of claim 12, wherein upon selecting a second of said one or more configurable buttons causes processing to be performed to send a notification to one or more attendees of the scheduled meeting that an attendee associated with said device is canceling the scheduled meeting.

16. The method of claim 12, wherein said device is a phone.

17. The method of claim 12, wherein said device is a mobile communications device.

18. A computer readable storage medium comprising executable code for configuring a device comprising code that:
   determines one or more operations in accordance with a scheduled meeting; and
   provides one or more configurable buttons on the device, each of said one or more configurable buttons corresponding to one of said operations, wherein selecting a first of said one or more configurable buttons causes processing to be performed to arrange a second meeting with attendees of said scheduled meeting.

19. The computer readable medium of claim 18, wherein the second meeting is to occur at a current time when performing said selecting.

20. The computer readable medium of claim 18, wherein the second meeting is arranged between the attendees by a component of said device communicating with another device for each of the attendees.

* * * * *